Patented July 14, 1925.

1,545,931

UNITED STATES PATENT OFFICE.

CARL WEEKS, OF DES MOINES, IOWA, ASSIGNOR TO THE ARMAND COMPANY, OF DES MOINES, IOWA.

COSMETIC.

No Drawing.      Application filed May 8, 1925. Serial No. 28,949.

*To all whom it may concern:*

Be it known that I, CARL WEEKS, a citizen of the United States, and a resident of Des Moines, in the county of Polk and State of Iowa, have invented a certain new and useful Cosmetic, of which the following is a specification.

My invention has to do particularly with a toilet preparation or cosmetic wherein the characteristic properties of a cleansing cream and eau de cologne are combined, so that by the use of the combined ingredients, the skin may be cleansed thoroughly, and at the same time, the eau de cologne contents will serve as an astringent in a manner more satisfactory than if used separately.

It is well known that cleansing cream is used on the skin to give a soft and pleasing appearance thereto and to thoroughly cleanse the skin. However, in so doing by the use of cleansing cream alone, a blanket or thin layer of cleansing cream is spread over the face and the cleansing cream being impervious to air has a tendency to open the pores and start an unpleasant sweat, which often continues even after the removal of the cleansing cream.

In order to insure proper closing of the pores and to avoid the unpleasant after effect of using ordinary cleansing cream, some astringent is used to quickly close the pores and give to the skin the desired soft and natural appearance of a thoroughly cleansed skin.

The ordinary cleansing cream as generally used serves strictly as a cleanser, and it is my object to compound a cosmetic or toilet preparation, wherein the cleansing cream may serve as a cleanser without the undesired effect of opening the pores and creating an unnatural sweat by combining with the cleansing cream properties eau de cologne, which is a hydroalcoholic ingredient mixed with volatile oils, wherein the alcoholic ingredient will maintain the pores in their natural state and avoid the unpleasant after effects created by using ordinary cleansing cream.

Both cleansing cream and eau de cologne preparations have desirable characteristics peculiar in themselves, and it is my object to combine the advantageous characteristics of both of the preparations in a single preparation, wherein the advantageous characteristics of both of the preparations may be utilized at the same time by a single application, and thus eliminate any of the undesirable characteristics that are found in ordinary cleansing cream when used by itself.

It is well known that eau de cologne used as an astringent alone often creates a dryness of the skin, which is undesirable, and this undesirable characteristic is avoided by my combination of the eau de cologne and cleansing cream in a single preparation, wherein the oily materials, comprising part of the cleansing cream itself serve to counteract the tendency of the eau de cologne to dry the skin.

It is an object therefore of my invention to provide a cosmetic preparation having the combined properties of a cleansing cream and an astringent.

In my invention, I provide a composition containing cleansing cream and an astringent characteristic in a single preparation, so that when the preparation is rubbed upon the skin, the oils in the cleansing cream and in the eau de cologne may be absorbed by the skin, and when the remainder of the preparation is removed from the face for cleansing it, the astringent materials in the preparation will have served the purpose of acting as an astringent for the skin after the removal of the preparation, and at the same time will have served to prevent the unnatural sweating of the face and opening of the pores caused by use of the cleansing cream alone.

In the manufacture of my preparation, I preferably first compound ordinary cleansing cream, which is composed of oil, which may be of vegetable or mineral origin, beeswax, ceresin or paraffin, and a solution of borax. The cleansing cream may be perfumed with any odor desired.

Eau de cologne, which I combine with the cleansing cream consists generally of a hydro alcoholic solution mixed with volatile oils of which the following are the principal ones: lemon, orange, bergamot, rosemary and oil of orange flowers. The various volatile oils are combined with the hydro alcoholic solution varying in percentages according to the particular eau de cologne desired. Ordinarily the volatile oils are very low in percentage of quantity compared with the quantity of hydro alcoholic solution used.

The eau de cologne, which consists of a high percentage of alcohol, serves as an astringent and is mixed with the cleansing cream thoroughly, so that the completed product may have the consistency of ordinary cleansing cream.

One of the advantages of my cosmetic is the possibility of getting a thorough and proper cleansing of the skin without the tendency of having the cleanser open the pores and produce any unpleasant sweating sensations.

I am aware that perfumes have been used in both eau de cologne or astringents and cleansing cream, and it is my intention to cover by my claims a cosmetic consisting of the combination of a cleansing cream with a hydro alcoholic mixture or solution containing a sufficient percentage of alcohol to serve as an appreciable astringent for the skin during and after the application of the cosmetic.

I claim as my invention:

1. A cosmetic comprising a cleansing cream base, combined with a hydro-alcoholic mixture containing a sufficient percentage of alcohol to produce an appreciable astringent action on the skin during the application of the cosmetic.

2. A cosmetic consisting of a cleansing cream base, combined with eau de cologne comprising a hydro-alcoholic solution of volatile oil having a sufficient percentage of alcohol to produce an appreciable astringent during the application of the cosmetic to the skin.

CARL WEEKS.